Jan. 19, 1943. W. R. WHEELER 2,308,636
APPARATUS FOR INJECTION MOLDING VINYL RESINS
Filed Nov. 11, 1937 2 Sheets-Sheet 2
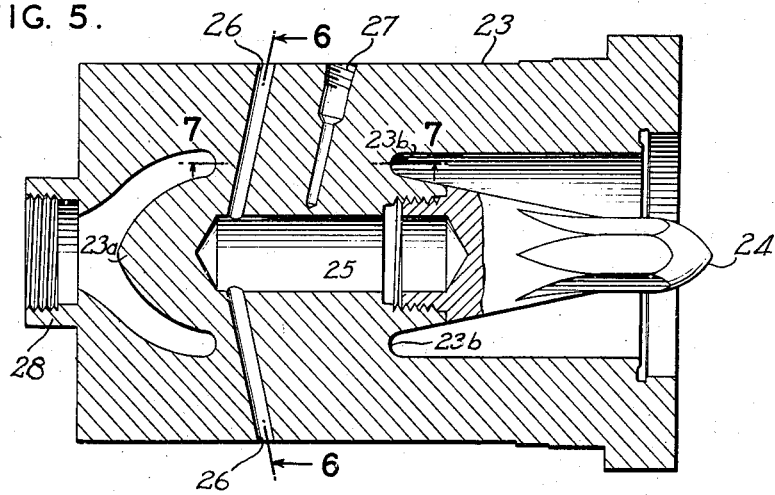
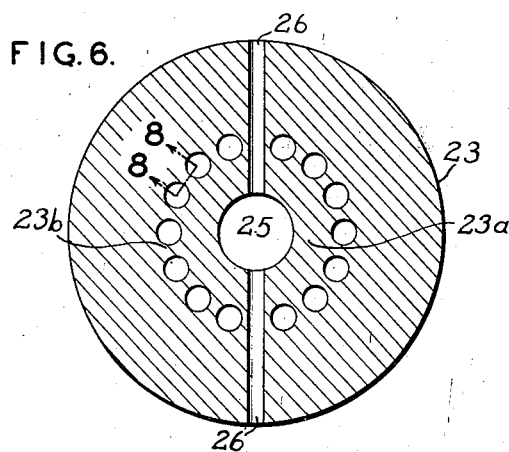
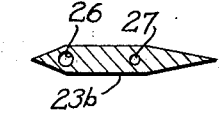
INVENTOR
WILLIAM R. WHEELER
BY
ATTORNEY Patented Jan. 19, 1943

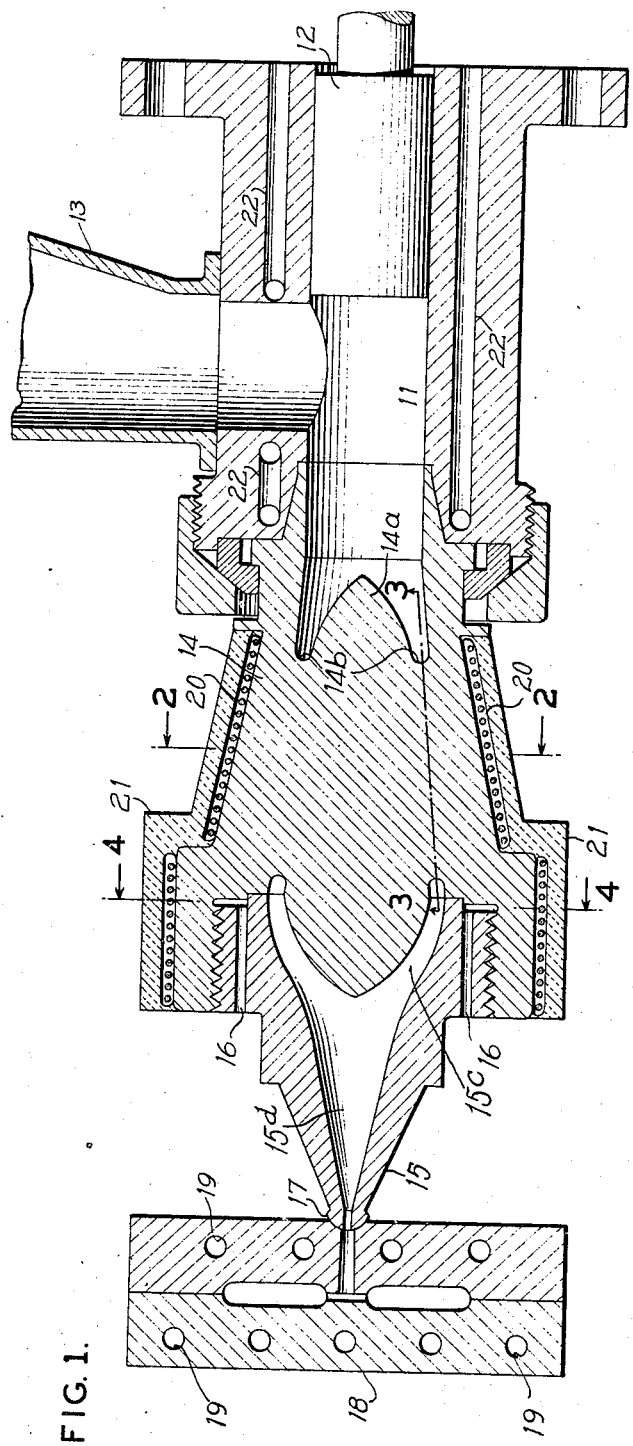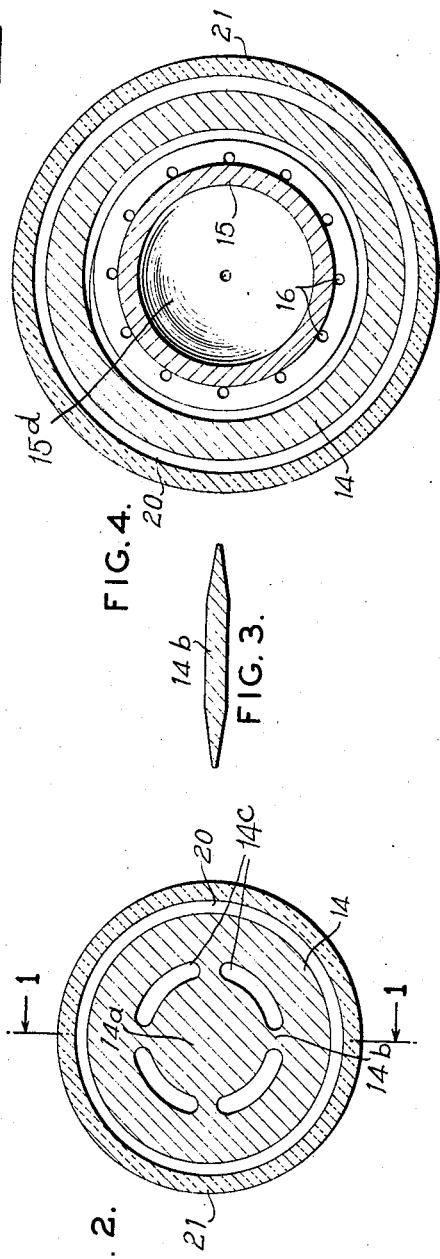

2,308,636

UNITED STATES PATENT OFFICE 2,308,636

APPARATUS FOR INJECTION MOLDING VINYL RESINS

William R. Wheeler, Lakewood, Ohio, assignor to Carbide and Carbon Chemicals Corporation, a corporation of New York Application November 11, 1937, Serial No. 174,033

4 Claims. (Cl. 18—30)

This invention relates to apparatus for forming shaped articles of thermoplastic materials which are sensitive to decomposition by heat, and it is particularly directed to the injection molding of thermoplastic materials which contain vinyl resins.

The most satisfactory injection molding machines commercially employed are the type in which a solid cylindrical piston moves in a cylinder which it can occupy completely, and feeds powdered material into one end of an adjacent chamber in which it is brought to a plastic condition by heating, while at the same time an equal amount of the molding material, in a condition approaching fluidity, is injected into a mold through a nozzle at the other end of the chamber.

Usually the heating chamber is provided with an inserted core supported within the chamber by vanes which serve also as heat conductors. The core may be separately heated, for instance, by an electrical heating element located within a hollow core. In such assembled structures having an inserted core, resin is inevitably forced into the crevices and joints between the parts where, in the case of heat-sensitive resins, it decomposes with consequent discoloration of the extruded material.

In the injection molding of heat-sensitive thermoplastic materials containing vinyl resins, the molding methods and apparatus commonly used have proven unsatisfactory. The vinyl resins, particularly the vinyl ester resins of high softening point, become discolored or decompose at temperatures only slightly above those necessary to obtain sufficient plasticity to permit satisfactory injection molding at reasonable pressures. That is, the temperature to which a particular resin may be heated without decomposition or color change is critical. This is a serious problem where the resin is one which has an unusually high softening temperature, such as those formed by the conjoint polymerization of vinyl halides and vinyl esters of the lower aliphatic acids, and this is particularly true of the conjoint polymers of vinyl chloride with vinyl acetate which are well known for their high softening temperatures when they contain large proportions of vinyl chloride.

Therefore it is necessary, in the injection molding of heat-sensitive materials containing vinyl resins, that the wall temperature of the heating chamber and nozzle of the injection apparatus be maintained as low as possible commensurate with the resin mass temperature desired, and that the other parts of the apparatus which are in contact with the molding material be maintained at a temperature below the softening point of the resin. Since it is practically impossible to prevent vinyl resins from discoloring if subjected to temperatures above their softening points for long periods of time, it is imperative that the heated parts of the apparatus which are in contact with molding material containing such a resin be free from all crevices, uneven places or joints into which the plastic may be forced and remain. For if even the most minute amounts of resin become decomposed or discolored and are in contact with fresh material passing through the apparatus, the molded articles will be streaked and their quality impaired until the offending products of decomposition are completely removed from the machine. For the above reasons it is additionally highly desirable to maintain as short a contact time as possible between the resin mass and the heated surfaces of the machine.

The conditions for optimum operation may be attained and the difficulties present heretofore can be largely obviated by constructing the heating chamber and core in one unit, and the nozzle and mold in another unit. The two units may be joined together by any suitable means, and this single joint preferably is designed to permit whatever small amounts of material which are forced thereinto to continue flowing outward and away from the resin mass, thereby to avoid decomposition and consequent discoloration of the molded articles. This construction permits taking full advantage of improved flow conditions, inasmuch as irregular internal contours in the heating chamber and nozzle caused by joints, shoulders, lips or other constructional features may be largely eliminated. With the vinyl resins, which are inherently poor in heat transfer properties, it is desirable to employ paths of narrow cross section through which the molding material may flow so as to effect a more rapid heat transfer to and fluxing of the material. For this reason, this invention is particularly directed to the injection molding of heat-sensitive materials containing vinyl resins which are formed by the conjoint polymerization of vinyl chloride with vinyl acetate and having between 75% and 95% of vinyl chloride in the polymer.

The accompanying drawings diagrammatically show several embodiments of the invention, in which:

Fig. 1, which is taken along the line 1—1 of Fig. 2, illustrates one embodiment of the invention comprising a coaxially arranged cylinder and heating chamber provided with an integral core;

Fig. 2 is a cross section of a portion of the apparatus of Fig. 1 taken along the line 2—2;

Fig. 3 shows a cross section of another part of the apparatus of Fig. 1 taken along the line 3—3;

Fig. 4 shows a cross section of a third part of the apparatus of Fig. 1 taken along the line 4—4;

Fig. 5 shows another embodiment of the invention in which the heating chamber is cylindrical and the core is hollow to provide for heating means. The piston and hopper assembly have been omitted for simplicity;

Fig. 6 is a cross section of a part of the device of Fig. 5 taken along the line 6—6;

Fig. 7 shows a cross section of another part of the device of Fig. 5 taken along the line 7—7;

Fig. 8 shows a cross section of a third part of the device of Fig. 5 taken along the line 8—8 of Fig. 6.

As shown in Fig. 1, a solid cylindrical piston 12 reciprocates in a cylinder 11 and forces powdered or granular molding material, dropping from a hopper 13, into a heating chamber 14. A core 14a is integrally connected to and spaced from the walls of the chamber 14 by vanes 14b. Passages 14c are provided and defined by the walls of the chamber 14 and by the surfaces of the core 14a and vanes 14b, the design of which is preferably streamlined so as to permit all of the material flowing through the passages 14c to flow therethrough at substantially uniform speed, and so as to impede as little as possible the flow of any part of the material through these passages. The diameter of the chamber 14 and the diameter of core 14a increase progressively in the direction of flow of material through passage 14c, and the cross-sectional area of these passages is determined by varying the difference between the diameters of the chamber and the core. By means of this type of construction the molding material flowing through passages 14c can be heated uniformly and the temperature thereof can be closely controlled. The passages 14c communicate with passages 15c and chamber 15d of a nozzle unit 15, the extrusion end of which may consist of a single nozzle, as shown, or a multiple nozzle. The nozzle unit 15 may be threadedly connected to the chamber 14 by a special joint (a cross section of which is shown in Fig. 4) and having channels 16 which permit the plastic which may be forced into the joint to pass unimpeded to the outside of the chamber, thus avoiding retention in the joint of any material which might subsequently decompose. The diameter of nozzle chamber 15d gradually decreases in the direction toward the discharge end 17 of the nozzle, shown in contact with a mold 18 which is cooled by water or other suitable cooling media flowing through the passages 19. About the chamber 14 is disposed an electrically heated jacket 20 and heat insulation 21. Since it is most important to prevent softened resin from oozing backward into the chamber of cylinder 11 and binding the piston 12, the cylinder 11 is kept cool by water, or other cooling media, flowing through passages 22, whereby also the pulverulent molding material in the cylinder 11 is cooled, thus preventing the particles from coalescing, and shortening the length of time the resin is exposed to heat.

In Fig. 5, heating chamber unit 23 is cylindrical and one end is provided with a boss 28 which forms a fitting into which a nozzle of the desired shape may be fastened. A hollow core 23a is integrally connected to and spaced from the walls of the chamber 23 by vanes 23b. The open end of the core 23a is adapted to be closed by means of a plug 24 which is machined to fit the core very tightly, and the joint formed may be electroplated, or welded and machined, or otherwise treated, to obtain a perfectly smooth surface with no pockets or crevices into which material may be forced. A chamber 25 thus formed within the core 23a may contain an electrical heating element, and passages 26 are provided for electrical conductors. Since the temperature of the chamber 23 is critical for the successful molding of materials containing vinyl resins, a pyrometer well 27 is provided in the wall of chamber 23 so that accurate control of the chamber temperature can be effected.

The apparatus described may be varied considerably from the illustrations given herein without departing from the scope of the invention. For example, the heating chamber need not be of any particular shape provided it contains a core integral therewith. However, shapes which provide narrow paths for heating the molding material and are of streamlined form to permit greater speed of injection without the necessity of extremely high pressures, are preferred. The heating chamber may be heated externally, as in Fig. 1, internally as in Fig. 5, or by combinations of these methods.

Other variations will be apparent to those skilled in the art, and the invention should not be limited other than as defined by the appended claims.

I claim:

1. An apparatus for injection moulding of heat sensitive thermoplastic material, comprising a hollow member adapted to receive and heat pulverulent plastic material to a semi-fluid condition, said member having an internal core and means for heating said core, said heating means including vanes joining said core and said member and being integral therewith for forming uninterrupted metallic heat-conducting paths free of joints for equalizing the temperature of the surfaces of said member with which said material is brought in contact, said surfaces being free from crevices and joints into which said material may be forced and where it may remain and decompose; means for forcing pulverulent plastic material into one end of said hollow member and in contact with said heated and temperature-equalized surfaces; and nozzle means secured to the other end of said member for receiving the resulting heated material leaving said surfaces and for discharging such material free of decomposition and discoloration from said apparatus.

2. A heating unit for an injection molding apparatus, comprising, a hollow member having an internal solid core and vanes integrally united with said core and the wall of said member to form a continuous thermal-conductive structure free of joints, said vanes and the external surface of said core and the wall of said member defining a heating chamber free of crevices and joints into which molding material may be forced and where it may remain and decompose; means for externally heating said member; said vanes being so constructed and arranged as to permit heat to flow therethrough along uninterrupted metallic heat-conducting paths from the wall of said member to said core and to maintain all the surfaces of said chamber at substantially the same temperature during use.

3. A heating unit for an injection molding apparatus, comprising a hollow member having an internal hollow core and vanes integrally joined to said core and said member to form a continuous thermal-conductive structure free of joints, said vanes and the external walls of said core and the internal walls of said member defining a heating chamber free of crevices and joints into which molding material may be forced and where it may remain and decompose; said member being provided with passages extending from the external surface of said member through said vanes into said core for internally heating said core to maintain all of the surfaces of said chamber at substantially the same temperature during use.

4. A heating unit for an injection molding apparatus comprising a hollow member having an internal hollow core adapted to receive an electrical heating element, and vanes integrally joined to said core and said member to form a continuous thermal-conductive structure free of joints, said vanes and the external walls of said core and the internal walls of said member defining a heating chamber free of crevices and joints into which molding material may be forced and where it may remain and decompose; said member being provided with at least one passage extending from the external surface of said member through said vanes into said core, for the passage of electrical conductors from the exterior of said unit to said electrical heating element, said element being adapted to maintain all of the surfaces of said chamber at substantially the same temperature during use.

WILLIAM R. WHEELER.